United States Patent [19]

Breen

[11] Patent Number: 4,822,164
[45] Date of Patent: Apr. 18, 1989

[54] OPTICAL INSPECTION DEVICE AND METHOD

[75] Inventor: Michael T. Breen, Garden City, Mich.

[73] Assignee: Eaton Corporation, Cleveland, Ohio

[21] Appl. No.: 103,088

[22] Filed: Sep. 30, 1987

[51] Int. Cl.$^4$ .............................................. G01P 3/36
[52] U.S. Cl. ...................................... 356/28.5; 356/5
[58] Field of Search ................................. 356/5, 28.5

[56] References Cited

U.S. PATENT DOCUMENTS

| | | | |
|---|---|---|---|
| 3,508,828 | 4/1970 | Froome et al. | |
| 3,652,161 | 3/1972 | Ross | 356/5 |
| 3,950,100 | 4/1976 | Keene et al. | |
| 4,167,329 | 9/1979 | Jelalian et al. | 356/5 |
| 4,190,361 | 2/1980 | Dubrunfaut | 356/5 |
| 4,516,853 | 5/1985 | Pearson | 356/152 |
| 4,572,662 | 2/1986 | Silverman | 356/5 |
| 4,595,287 | 6/1986 | Edlin | 356/28.5 |
| 4,690,551 | 9/1987 | Edwards et al. | 356/5 |
| 4,743,110 | 5/1988 | Arnaud et al. | 356/5 |

Primary Examiner—Stephen C. Buczinski
Attorney, Agent, or Firm—C. H. Grace

[57] ABSTRACT

A closed loop optical gauge directs a laser beam toward an object whose radial velocity, instantaneous position, and/or shape are to be measured, and utilizes the Doppler frequency shift of the reflected beam to make measurements. A reference sample of the original direct beam has its frequency shifted by an acoustooptical modulator. A closed loop system is created by sensing the difference in frequency between the reflected beam and the shifted reference beam. The amount of frequency modulation is then controlled so that the frequency of the shifted reference beam continuouly tracks that of the reflected beam, preferably with a fixed offset of frequency. The output can be integrated with respect to time to obtain position or shape information.

Absolute distance to the object is measured by transmitting a train of pulses of light toward the object and receiving reflected light pulses back. The round trip time of the light pulses is ascertained by measuring the phase displacement of the envelope of the reflected signals relative to the envelope of the transmitted light signals, with the aid of a phase locked loop. The oscillator of the phase locked loop is locked to the envelope of a reference sample of the transmitted signal, and can operate selectively at the fundamental frequency or a higher harmonic frequency of that envelope. A selected harmonic from the oscillator can be compared as to phase with the corresponding harmonic of the reflected light pulses. With calibration, the system can measure flight time, and therefore distance to the object, with high resolving power at the higher harmonic frequencies.

18 Claims, 2 Drawing Sheets

4,822,164

OPTICAL INSPECTION DEVICE AND METHOD

CROSS REFERENCES TO RELATED APPLICATIONS

This application is one of a group of related applications that were filed simultaneously on Sept. 30, 1987, including Ser. No. 103,085 entitled "Dynamic Doppler Optical Gauge"; Ser. No. 103/086 entitled "Chirp Doppler Optical Gauge; Ser. No. 103,087 entitled "Laser Doppler and Time of Flight Range Measurement"; and Ser. No. 103,092 entitled "Laser Distance Measuring Method and Apparatus". All were invented by Michael T. Breen.

FIELD

The invention relates to a branch of laser metrology in which the shape and/or the motion of an object, for example the shape of a manufactured part that is moving on a conveyor, is measured optically.

PRIOR ART

Prior known instruments do not have capability for obtaining data regarding both absolute and relative distance and for combining them in the manner of the present invention. Prior known laser metrological instruments based on Doppler shift, which ordinarily are of an open-loop configuration, are inherently not as accurate as the disclosed form of closed-loop Doppler.

Many range measuring systems are available that operate by measuring the time of flight of a light signal that is directed to an object and reflected back from it. The relative time of occurrence between a reference signal pulse initiated at the gauge and the signal pulse that was returned from the object can be measured, and, ambiguities resolved if necessary. In view of the known velocity of propagation, the distance to the object can be ascertained.

SUMMARY

To obtain shape information about the object under inspection, both the Doppler shift of a laser beam reflected from the object and the "time of flight" of a reflected laser pulse envelope are measured. The effects of motion of the object can be separated from the shape information, and either set of information can be disregarded by the system or presented as additional data.

One object of the invention is to provide a system capable of measuring a manufactured item on a moving conveyor to ascertain its shape.

Another object is to provide a data gathering system in which components of the data that are due to the shape of the target are separable from components of the data that are due to motion of a conveyor upon which the target is carried.

Another object is to provide a system for inspection of a manufactured item that employs programed dither of the laser beam's direction in order to help separate motion-induced data from data regarding the shape of the item.

Another object is to provide conveyor monitoring means such as calibration articles or fiduciary marks on the conveyor within the field scanned by the laser beam, so that conveyer-induced data can be deleted to get only shape-induced data.

Another object is to provide a system for inspecting an item on a moving conveyor, in which scanning in a direction longitudinal of the conveyor is accomplished by travel of the conveyor, and transverse scanning is accomplished by controllably deflecting a laser beam.

Another object of the invention is provide apparatus for making very accurate measurements of the phase of a reference laser pulse envelope relative to the phase of a target return pulse envelope.

Another object is accurately to measure the relative phase of a laser reference beam and a target return beam by tracking the fundamental or a higher harmonic of the reference beam with an electronic (not optical) phase locked loop.

Another object is to improve accuracy by tracking the fundamental or a higher harmonic of the target return beam with an electronic (not optical) phase locked loop.

Another object is to improve accuracy by tracking the fundamental or a higher harmonic of both the reference beam and the target return beam with electronic (not optical) phase locked loops.

DETAILED DESCRIPTION OF INVENTION

Two principles of operation for measurement are combined into one gauging apparatus. A laser beam is directed to a moving spot on an object whose shape is to be measured, and is reflected from the object. If the reflection spot on the surface of the object has a radial component of velocity with respect to the gauge, the reflected beam is different in frequency from the outbound beam due to Doppler effect. The invented system uses the Doppler frequency shift of the reflected beam as one means of measurement of the motion, in a closed loop system. Simultaneously another means of measurement, a time of flight system, measures absolute distance from the gauge to the object. The time of flight system is "open loop" from an optical standpoint, but the return signal from the target is tracked by a closed phase locked electronic loop. A scanner, a computer, and various other components are used in common by both systems.

In the Doppler portion of the gauge, a reference sample of the original direct beam is frequency-shifted by an acoustooptical modulator to produce a shifted reference beam. A closed feedback loop is formed by first sensing the difference in frequency between the reflected beam and the shifted reference beam. This is done by detecting, in a photodiode, the interference beat frequency between the shifted reference beam and the reflected beam. The amount of frequency shift of the shifted reference beam is then controlled so that the reference beam's frequency continuously tracks that of the reflected beam, (preferably with a frequency offset).

To accomplish this, an acoustooptical modulator is provided in the reference beam path and a modulation-controlling signal for it is provided by a voltage controlled oscillator (VCO). The VCO is controlled by a signal that varies in accordance with the radial velocity of the object relative to the gauge, and that also serves as a Doppler output voltage. Position information can be derived by integrating that Doppler output voltage with respect to time.

Figure 1:
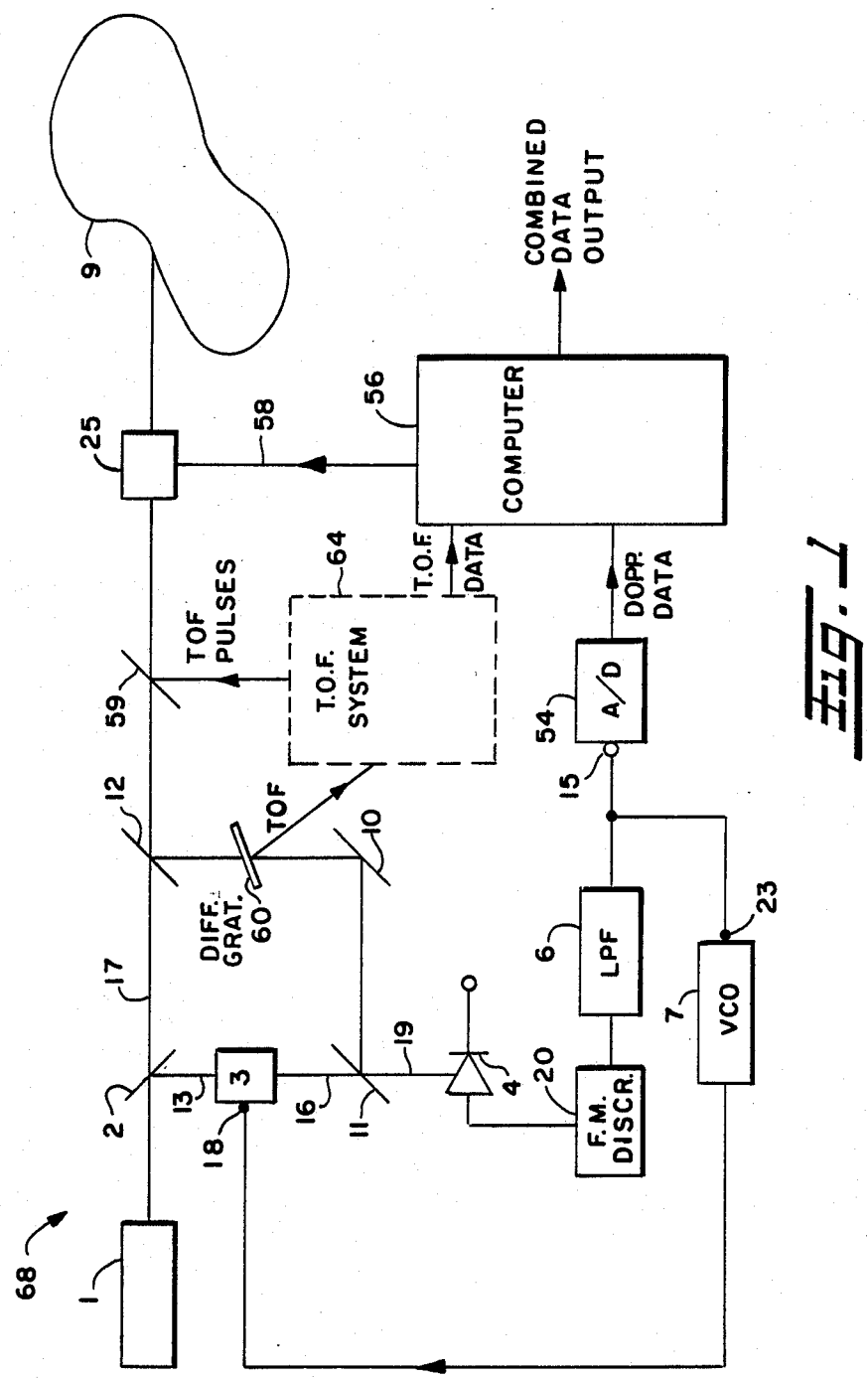
FIG. 1 is a simplified block diagram of a preferred embodiment of the Doppler portion of the invention.

As shown in FIG. 1, a single frequency laser 1 produces a monochromatic beam, which is divided by a beam splitter 2 into a direct beam 17 and a redirected reference beam 13. The redirected reference beam enters an acoustooptical modulator, which is preferably a Raman-Nath cell 3. A modulating signal for the modulator cell is input at a terminal 18 of modulator 3. A portion 16 of the beam energy is shifted in frequency by the modulator, and the shifted portion is arranged spatially to be the output of the modulator. The frequency shifted radiation beam 16, which serves as a shifted reference beam, passes directly through another beam splitter 11 toward a photodiode 4.

The direct beam 17 passes through a beam splitter 70 and a beam splitter 59, at which the pulsed time of flight beam is input. Both beams go through a scanner 25, and out to a target object 9, where they are reflected. Some of the energy reflected from the target returns to the beam splitter 70, where it is redirected as a beam 14 to a diffraction grating 60 and to a mirror 10. Light reflected from mirror 10 is redirected at the beam splitter 11 so as to join the shifted reference beam 16 passing straight through 11 from 3. The shifted reference and the reflected beam are the two components that form a composite beam 19 that falls upon the photodiode 4.

The two components of beam 19 interfere as they propagate to photodiode 4. Their interference envelope is detected by the photodiode 4 and converted to an electrical signal at a beat frequency. The electrical output signal from photodiode 4 is connected at a terminal 20 to an FM discriminator 5. The output of discriminator 5 is input to inverting integrator 6 the output of a switchable which has the analog data from the closed loop Doppler system. A switch 72 of the integrator 6 can be opened to convert integrator 6 to a mere inverter if that mode of operation is prefered. Terminal 15 feeds on analog to digital (A/D) converter 54, whose output goes to a computer 56.

Connection is also made from the output of the integrator 6 to a control input terminal 23 of a voltage controlled oscillator (VCO) 7. A feedback loop is provided. It is closed by connecting the output of VCO 7 to the modulator 3 (at terminal 18) to modulate the frequency of the shifted reference beam 16. That modulation affects the beat frequency of the composite beam 19, to complete a negative feedback closed loop system.

To avoid having to operate the VCO at an inconvenient frequency, the circuit can easily be offset in any of several ways. In the embodiment shown, zero voltage output is provided at terminal 15 when the VCO 7 is operating at a predetermined arbitrary offset frequency that corresponds to zero Doppler shift of the reflected beam 14. For example, if a VCO frequency of 40 MHz is selected to correspond to a stationary target 9, a voltage of zero at the output of filter 6 is arranged to result in a VCO frequency of 40 MHz, and the acoustooptical modulator 3 is modulated so that the frequency of its shifted reference beam 16 is less than the frequency of its incoming beam 13 by 40 MHz. The beat frequency produced by the two component beams of the composite beam 19 is therefore 40 MHz, and the signal at terminal 20 of the discriminator 5 is 40 MHz.

When the target 9 moves toward the laser 1, a Doppler shift increases the frequency of the reflected beam 14. This shift transiently tends to decrease the beat frequency at terminal 20, which promptly increases the frequency of the VCO, which increases the frequency of the shifted reference beam 16 by means of the modulator 3. As the target continues to move toward the laser the beat frequency at terminal 20 becomes 40 MHz. The voltage at terminal 15 has, in this example, a positive DC value.

This positive DC voltage at 15 is a measure of the Doppler frequency shift of the moving target 9 as detected by the laser beam, and corresponds to a radial velocity of the target with respect to the measurement apparatus. It can be calibrated in terms of velocity. Position information about the target can be obtained if desired by integrating the voltage output of terminal 15 with respect to time. An analog to digital converter 54 places the Doppler data in a form suitable for processing by a digital computer 56. The computer preferable includes the integration function required for converting Doppler velocity data to radial distance data. Among other things the computer also includes means for combining the data gathered by the two portions of the gauge, i.e., Doppler and time of flight, to produce unitary output information.

To operate the device to determine the shape of the target 9, an optical beam scanner 25, forms of which are well known in the art, is interposed in the target beam. Variations of range during scanning then create Doppler-like shifts of the frequency of the beam reflected from the target.

The time of flight portion of the gauge is as follows. In the present invention, a laser produces mode locked pulses (i.e., envelope modulated pulses), of quasi monochromatic light. A phase locked loop is used to lock the phase of a local oscillator to the phase of envelope modulation of a reference beam, by means of a phase detector. The frequency at which a voltage controlled oscillator of the phase locked loop operates is selected to be the first harmonic or a higher harmonic frequency of the pulse envelope waveform with which the laser reference beam is pulse modulated. The frequency of the VCO is then applied to a second phase detector whose other input is the return signal reflected from the object. The second phase detector produces a D.C. output signal based upon the same harmonic of the reflected signal, and the VCO frequency. This enables the relative phase between reference and return beams to be measured accurately. The result is a relatively high resolution indication of the time of flight of the pulse to the object and back, and therefore of the range.

Figure 2:
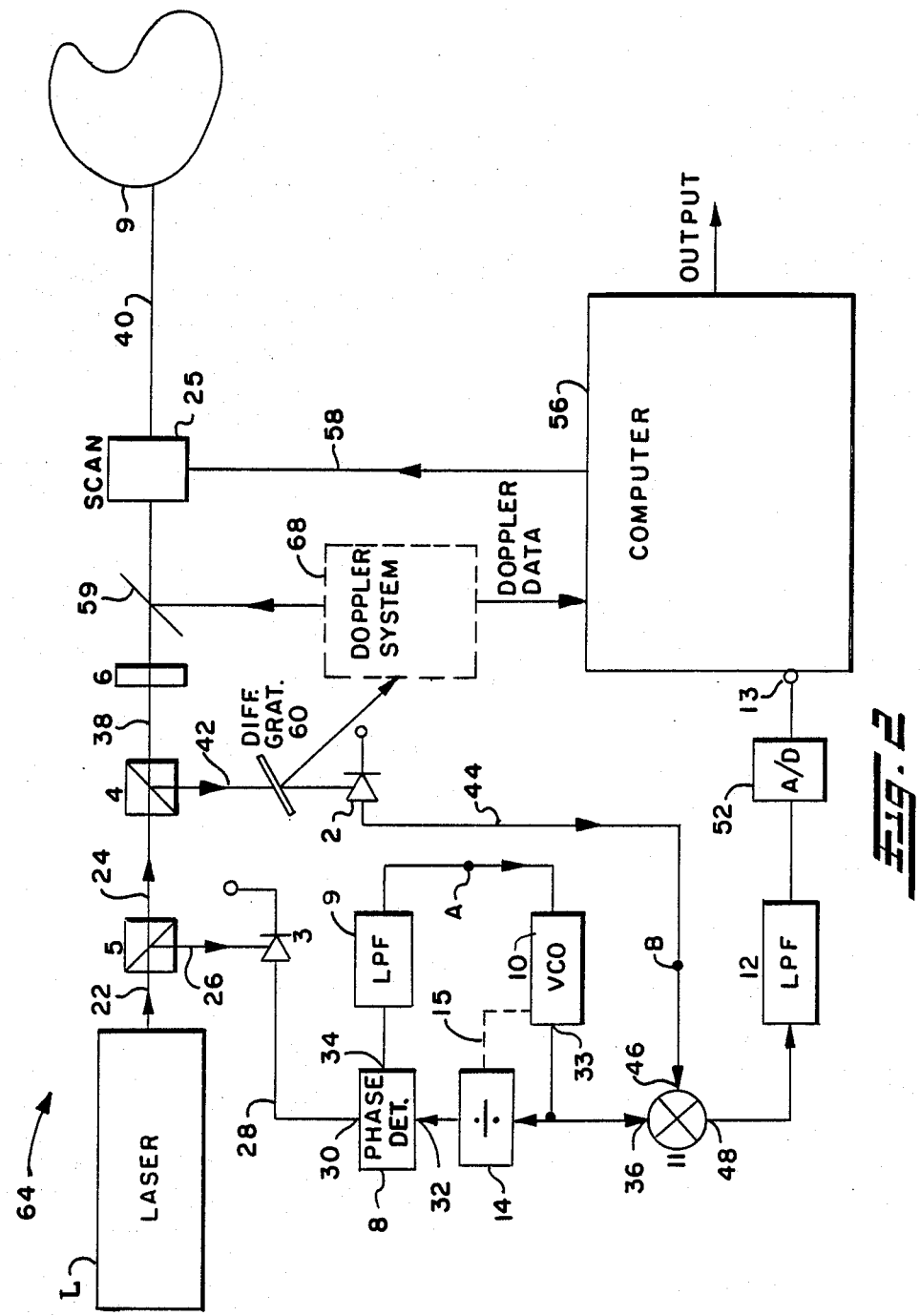
FIG. 2 is a block diagram of a preferred embodiment of the time of flight portion of the invention.

As shown in FIG. 2, a mode locked Argon ion laser L emits a monochromatic beam 22 of laser pulses, which are radiated periodically in dirac delta function like envlopes. The light is divided at a beam splitter 5, with a portion 24 passing directly through the beam splitter 5 and a portion 26 being redirected to serve as a reference beam.

The redirected beam portion 26, FIG. 2, falls upon the photosensitive surface of a high speed photodiode detector 3. Coming from detector 3 is an electrical signal 28, FIG. 3 which is the envelope of the pulse waveform of reference signal 26. The detected envelope signal 28 is applied to an input 30 of a phase detector 8. Another input terminal 32 to the phase detector 8 receives a signal from a frequency divider 14.

The phase detector 8, a low pass filter 9, and a voltage controlled oscillator (VCO) 10, and the frequency divider 14 comprise a phase locked loop. The loop tracks the signal at terminal 30. At a terminal 34 of the phase detector 8, a phase error signal is output; it is connected to the filter 9.

An amplifier can be interposed at point A between filter 9 and VCO 10 for design convenience if desired. The free-running frequency of VCO 10 can be at the fundamental frequency or a higher harmonic frequency of signal 28. The VCO is followed by a frequency divider 14, whose output closes the phase locked loop at terminal 32.

Selection of frequency or harmonic number is made in the VCO 10. The divisor of the frequency divider 14 is selected correspondingly, so as to provide the fundamental envelope frequency at terminal 32 of the phase detector 8. On FIG. 2, a connection line 15 indicates the linkage between the harmonic number setting of the VCO 10 and the divider 14.

The output 33 of the VCO 10 is also connected to a terminal 36 of a mixer 11. The signal at terminal 36 is a phase reference signal, and can be of the first harmonic (fundamental) frequency or a higher numbered harmonic frequency of the pulse envelope, as selected in the VCO.

The target-directed portion of the laser beam will now be described. A portion 24 of the laser beam 22 passes directly through the beam splitter 5, and travels to and through a polarizing beam splitter 70. It continues to a quarter wave plate 6, which circularly polarizes the beam, then propagates as beam 38 toward the target 7. At the target, whose distance from the gauge is to be measured, the laser light reflects or scatters, with some of its energy returning as a coherent light wave 40 back to the plate 6.

The reflected beam 40 is linearly polarized at plate 6, and redirected by reflection at the beam splitter 70. The reflected beam 42 from splitter 70 falls on the photosensitive surface of another fast photodiode detector 2. From photodiode 2, an output electrical signal 44, which replicates the pulse modulation envelope of the beam 42, is conducted to a second input terminal 46 of the mixer 11. A bandpass filter for selecting a harmonic can be employed at a point B, whose pass frequency is selectable to match the harmonic frequency selected at the VCO 10.

The phase comparator or mixer 11 has a reference phase signal on its input terminal 36 and a data signal on its input terminal 46. The mixer enables the signal at 36 to interact with the corresponding harmonic component of the return signal at 46. Comparator 11 outputs a phase difference signal from its terminal 48, which depends upon the phase relationship between the signal at 36 and the corresponding harmonic component of the return signal at 46.

That phase difference signal feeds a low pass filter network 12. To put the data in a form that is usable by a computer 56, an analog to digital converter 52 receives the signal from filter 12, processes it, and delivers it to a group of terminals that are designated by the single reference number 13. A time of flight output from the system is at terminals 13; it is data that varies more or less linearly in accordance with the difference in path delays, both spatial and electrical, of the reference and the target data signal.

At higher harmonic frequencies of the VCO, ambiguities in the distance measurement are more numerous and may have to be resolved. The system must be calibrated to take account of the equipment-related difference in phase between the selected harmonic of the VCO and the corresponding harmonic of the signal reflected from the object.

The computer 56 controls the scanner 25 via control signals on lines 58, in accordance with a program. The computer therefore always has the coordinates of the direction of the laser beam. It receives and records distance data corresponding to each address (i.e., at each set of direction coordinates) of the laser beam where a reading is taken. The computer is therefore able to provide final output data sufficient to map the scene that lies within its scanning purview, based upon both Doppler and time of flight data.

Successive readings are usually taken at slightly different directions of the laser beam. Some of the (radial) distance data come from Doppler measurements and some come from time of flight measurements. Integrated Doppler data are utilized by "connecting the dots", i.e., by incremental steps of distance between each point of reading and the next succeeding point of reading. Where data from its two sources differ, the computer 56 reconciles the data in favor of that which is known to be more precise. Preferably, differing data are reconciled by weighting the readings according to their respective accuracies. The gauge is made more accurate by using many system components in common for both Doppler and time of flight measurements.

When the object whose shape is being inspected is traveling on a conveyor or otherwise moving with respect to the gauge, the data taken by the gauge is attributable to both the shape of the object and effects of its motion. Several approaches to dealing with the problem of data corruption caused by irregularities and unreproducibility of conveyor motion are possible.

The speed of the conveyor is known approximately, and to some extent can be calibrated out by programming. Also, the gauge and its computer can be put in a learning mode. A prototype calibration object of known shape can then be moved along the conveyor and its readings recorded by the gauge; subsequent inspections of similar objects traveling under the same conditions can be compared with the learned data. If the subsequently inspected objects yield identical readings as the prototype calibration object, the subsequent ones are known to have the same shape.

The program of readings (i.e., beam directions and distance data points) results in some redundancy of data because some of the readings may cover the same reflection spot on the object or a closely neighboring reflection spot. Consequently, there is an opportunity to separate the shape information from the conveyor motion. To implement this approach, the program of beam excursions includes two steps forward and one step back, then two more steps forward and one step back, and so forth. The reading taken at an address of one step back is partially redundant with the reading previously taken at the address of the second step forward. Other patterns of beam dither are also easily devised.

Thus, in order to separate the components of data that are due to shape of the object from those that are due to motion of the conveyor, dither of the beam's direction is employed to increase the redundancy of readings. It is a routine computer programing task to subtract one redundant reading from another to obtain data that are closely related to shape. The fact the object is viewed from different angles as it proceeds along its travel route is of no consequence if the dither method is employed along with the prototype calibration object method, and the inspection program is synchronized with arrival of the object. Longitudinal, transverse, and even vertical jiggling or other aberrations of motion can be disregarded by the gauge in its inspection process.

Similarly, other calibration objects, two dimensional or three dimensional, can be included on the conveyor within the field of view of the beam scanning program, to provide calibration and data purification information to the gauge.

If desired, the scanning route of the laser beam relative to the conveyor can be along only one axis, namely a direction transverse to the direction of motion of the conveyor. The conveyor's motion provides scanning in the longitudinal direction or axis. The relative motion of the object relative to the gauge that results from travel of the conveyor permits the gauge to operate with only a linear transverse scanning pattern. If desired, the gauge can be angularly cocked so that its one-axis linear scanning pattern is on a diagonal, whose longitudinal component is equal to the speed of the conveyor. The sequence of reading spots on the object being inspected is then a straight line perpendicular to the direction of travel of the object.

The concepts described here are equally applicable where it is desired to separate shape effects from motion effects in data, when the primary purpose is to gather motion information rather than shape information. Numerous other variations and embodiments are also possible, that are within the scope of the claims and the inventive concepts disclosed here.

What is claimed is:

1. A closed loop optical gauge comprising:
   laser means for producing a first beam;
   means for directing at least a portion of said first beam toward a target from which a beam is reflected;
   means for providing a reference beam having the frequency of said first beam;
   frequency shift means receiving said reference beam and receiving a modulation input signal, for providing a shifted reference beam whose frequency is shifted from that of the reference beam in accordance with the modulation input signal;
   means for producing interference of said shifted reference beam and said reflected beam to produce a beat frequency signal;
   negative feedback means for utilizing said beat frequency signal to control the frequency of said modulation input signal;
   whereby the frequency of said shifted reference beam tracks the reference of said reflected beam and has a known relationship to the radial component of velocity of said target.

2. A closed loop optical gauge as defined in claim 1 and wherein said means for producing interference of said beams comprises:
   detection means for detecting the envelope of a light beam incident thereon and producing an electrical signal corresponding to the envelope; and
   means for combining said shifted reference beam and said reflected beam to be incident upon said detection means.

3. A closed loop optical gauge as defined in claim 1 and wherein said negative feedback means for utilizing said beat frequency signal to control said modulation input signal comprises FM discriminator means receiving said beat frequency signal from said interference means, for controlling a voltage controlled oscillator to track the frequency of said beat frequency signal, the output of said voltage controlled oscillator being arranged to provide said modulation input signal.

4. A closed loop optical gauge as defined in claim 1 and wherein said means for providing a reference beam having the frequency of said first beam comprises:
   beam splitter means in said first beam for redirecting a portion of said first beam to said frequency shift means.

5. A closed loop optical gauge as defined in claim 1 and wherein said frequency shift means comprises acoustooptical modulator means for shifting the frequency of said reference beam by an amount dependent upon the modulation input signal.

6. A closed loop optical gauge as defined in claim 5 and wherein said acoustooptical modulator means comprises a Raman-Nath acoustooptical modulator.

7. Apparatus for measuring the distance to an object by optical time of flight measurement, comprising:
   light source means for providing an envelope modulated light beam directed to impinge upon said reflect from the object, whose envelope has a fundamental first harmonic component and at least one higher harmonic component;
   first detector means receiving a reference sample of the direct beam, for providing a first detected signal representing the envelope of said reference sample;
   phase locked loop means receiving said first signal, for locking the phase locked loop to said reference envelope;
   said loop comprising a controllable oscillator of predetermined output frequency, communicating with a frequency divider having a correspondingly predetermined divisor so that the divider's output frequency is equal to reference envelopes' fundamental frequency;
   second detector means receiving the beam reflected from the object, for providing a second detected signal representing the envelope of said reflected beam;
   main phase comparison means receiving (a) the output signal of said controllable oscillator and (b) at least the corresponding harmonic frequency of said second signal, for providing a third signal indicative of the phase difference between them.

8. Apparatus as defined in claim 7 and wherein said phase locked loop comprises means for selecting said predetermined oscillator frequency and said corresponding predetermined divisor from among more than one harmonic frequency.

9. Apparatus as defined in claim 7 and wherein said light source means for providing an envelope modulated beam comprises means for providing a substantially rectangular pulse modulated beam.

10. Apparatus as defined in claim 7 and wherein said light source means comprises laser means.

11. Apparatus as defined in claim 7 and wherein said phase locked loop means comprises, in addition to said controllable oscillator;
   phase lock phase comparison means receiving said first signal and the output signal of said divider, for producing a phase error signal; and
   frequency selective filter means receiving said phase error signal, for transmitting a predetermined range of frequency components of said phase error signal, and connected to provide a filtered phase error signal to said controllable oscillator.

12. Apparatus as defined in claim 7 and wherein said main phase comparison means comprises a second frequency selective filter means receiving the phase comparison of said signals (a) and (b), adapted for transmitting a predetermined range of frequency components thereof to constitute said third signal.

13. Apparatus for measuring the distance to an object by optical time of flight measurement, comprising:

pulse laser means for providing a periodic train of pulse envelopes of linearly polarized light in a directed beam, said train of envelopes comprising a fundamental first harmonic component and at least one higher harmonic component;

first polarized beam splitter means receiving said directed beam for directly transmitting a portion of it toward the object and redirecting a portion of it to serve as a reference beam;

first photodetector means receiving said reference beam from said first polarized beam splitter means, for providing a detected reference signal, in accordance with the envelope of pulses of said reference beam;

controllable oscillator means for producing a local signal having the frequency of one of said first and higher harmonic components of said detected reference signal;

frequency divider means communicating with the output of said controllable oscillator means, for dividing the frequency thereof by an integer that is the harmonic number of the frequency of the controllable oscillator means relative to the envelope of said pulse train;

phase comparison means receiving said detected reference signal and the output signal of said divider, for producing a phase lock error signal in accordance with the phase difference between them;

frequency selective filter means receiving said phase lock error signal, for transmitting a predetermined range of frequency components of said phase lock error signal, and having an output connected control the frequency of said controllable oscillator;

quarter wave plate means for circularly polarizing said direct portion of beam transmitted toward said object, and linearly polarizing the return beam reflected from said object;

polarized second beam splitter means receiving said reflected beam through said quarter wave plate means and redirecting at least a portion to represent said reflected beam;

second photodetector means receiving said redirected portion from said second beam splitter means, for providing a second detected signal in accordance with the envelope of pulses of said portion of said reflected beam;

phase comparison means receiving (a) the output signal of said controllable oscillator and (b) said second detected signal, for providing a third signal indicative of the phase difference between the output signal of the controllable oscillator and said selected harmonic frequency component of said second detected signal;

filter means receiving said third signal, for providing an output signal responsive to the difference in the time of flight of the two signals received by said phase comparison means.

14. A method of closed loop optical gauging comprising the steps of:

radiating a first laser beam toward a target from which a beam is reflected;

providing a reference beam having the frequency of said first beam;

applying said reference beam and a modulation input signal in a modulator, and modulating the reference beam to produce a shifted reference beam whose frequency is shifted in accordance with the modulation input signal;

interfering said shifted reference beam and said reflected beam to produce a beat frequency signal;

utilizing said beat frequency signal to control the frequency of said modulation input signal by means of negative feedback;

whereby the frequency of said shifted reference beam tracks the frequency of said reflected beam and corresponds to the radial component of velocity of said target.

15. A method of closed loop optical gauging as defined in claim 14 and wherein said step of interfering said shifted reference beam and said reflected beam comprises:

combining said shifted reference beam and said reflected beam to produce a light beam incident upon a detector; and, detecting the envelope of said light beam incident upon the detector and producing an electrical signal corresponding to the envelope.

16. A method of closed loop optical gauging as defined in claim 14 and wherein the step of utilizing said beat frequency signal to control said modulation input signal comprises;

communicating said beat frequency signal to an FM discriminator for controlling the voltage controlled oscillator; and arranging the output of said voltage controlled oscillator to provide said modulation input signal.

17. A method for closed loop optical gauging as defined in claim 14 and wherein said step of providing a reference beam having the frequency of said first beam comprises:

redirecting a portion of said first beam to said modulator with a beam splitter positioned in said first beam.

18. A method for closed loop optical gauging as defined in claim 14 and wherein said step of modulating said reference beam comprises modulating it in a Raman-Nath acoustooptical modulator.

* * * * *